Sept. 19, 1967 W. J. SMYTHE 3,342,019
GAS AND LIQUID SEPARATOR FOR GAS ANALYSIS
Filed Aug. 12, 1964
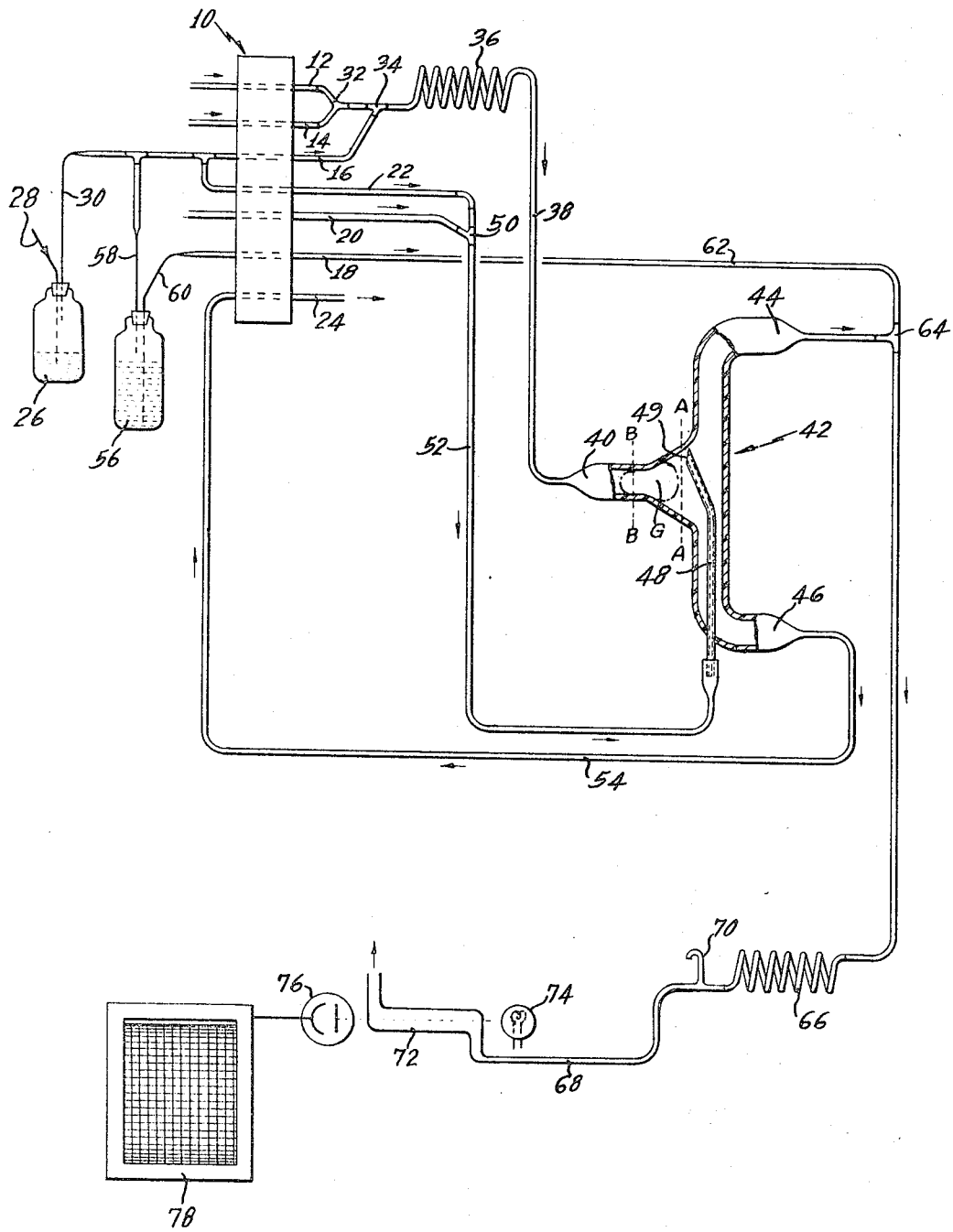
INVENTOR.
William J. Smythe
BY Harry Cohen
ATTORNEY

United States Patent Office 3,342,019
Patented Sept. 19, 1967

3,342,019
GAS AND LIQUID SEPARATOR FOR
GAS ANALYSIS
William J. Smythe, Rye, N.Y., assignor to Technicon
Corporation, a corporation of New York
Filed Aug. 12, 1964, Ser. No. 389,087
4 Claims. (Cl. 55—53)

This invention relates to the analysis of a material for a particular gaseous ingredient, and particularly to the continuous quantitative analysis of a liquid stream for carbon dioxide.

A method and an apparatus for the continuous determination of carbon dioxide is taught in the Skeggs patent. U.S. 2,967,764, issued Jan. 10, 1961. In this apparatus a plurality of unique samples, flowing as serial segments in a continuous stream may be individually and serially analyzed for carbon dioxide content, and a record made of the measurement.

It is an object of this invention to provide an improved method and an apparatus for the continuous determination of carbon dioxide.

It is another object of this invention to provide an improved method and apparatus for separating a gas from an entraining liquid.

It is yet another object of this invention to provide a gas separation apparatus wherein all of the entrained gas is captured for analysis.

It is still another object of this invention to provide a gas separation apparatus wherein the gas from each sample is washed out of the apparatus between samples, thereby precluding the contamination of succeeding samples.

It is moreover another object of this invention to provide a gas separation apparatus wherein the entraining liquid is precluded from passage into the gas detection subsystem.

A feature of this invention is the provision of a gas trap having a liquid-gas inlet, a gas outlet, a liquid outlet, and an additional gas inlet, the liquid-gas inlet having a progressively increasing cross-sectional area, and the additional gas inlet directing the flow of the additional gas towards said liquid-gas inlet.

The above and other objects, features and advantages of the present invention will be fully understood from the following description considered in connection with the accompanying drawing in which:

The figure is a diagrammatic view of an embodiment of the invention.

In the drawing, a proportioning pump 10 having seven pump tubes, 12, 14, 16, 18, 20, 22 and 24, is utilized to provide predetermined volumetric rates of flow throughout the apparatus. The proportioning pump may advantageously be of the type shown in the Ferrari, Jr. et al. patent, U.S. 2,935,028, issued May 3, 1960. Briefly, the pump includes a plurality of rollers which progressively occlude the pump tubes, which are made of a resilient material, to advance fluids through the tubes.

The inlet end of the pump tube 12 is coupled to a source, not shown, of the sample liquid to be analyzed. The sample liquid is supplied as a stream containing serial segments of unique liquid samples, each separated by an additional liquid or gas. The sample liquid may, for example, be blood plasma or serum. The inlet end of the pump tube 14 is coupled to a source of acid, not shown. The pump tube 16 is coupled to a source of carbon dioxide free air. A closed vessel 26 containing a solution of sodium hydroxide has a long inlet tube 28 communicating with the atmosphere and exiting into the solution. An outlet manifold 30, inletting above the solution, is coupled to the pump tube 16, which bubbles air through the solution to remove any carbon dioxide present. The pump tubes 12 and 14 are joined at a Y coupling 32 to mix the sample liquid with the acid. The coupling 32 and the pump tube 16 are joined at a Y coupling 34 to inject a supply of carbon dioxide free air bubbles into the sample liquid-acid stream. The function of this air is to scrub the inner surfaces of the apparatus conduits to preclude a preceding sample from contaminating a succeeding sample. The coupling 34 leads to the inlet of a mixing coil 36 wherein the sample liquid and the acid are fully mixed, liberating carbon dioxide which is entrained in the liquid stream. The outlet of the mixing coil is coupled by a conduit 38 to an inlet 40 of a gas trap 42. The gas trap comprises a vertically elongated chamber having an upper gas outlet 44 and a lower liquid outlet 46. The inlet 40 is mediately disposed between the outlets and has an increasing diameter and cross-sectional area as its side wall merges with the chamber side wall. That is, the diameter at section A—A is larger than the diameter at section B—B. A needle-like conduit 48 passes through the chamber side wall up into the chamber, and is bent so that its outlet 49 is directed into the inlet 40, particularly at the upper, inner portion of the inlet side wall. The inlet of the pump tube 20 is coupled to a source of antifoam agent, not shown, and the inlet of the pump tube 22 is coupled to the source of carbon dioxide free air manifold 30. The tubes 20 and 22 are joined at a Y coupling 50, which in turn is coupled by a conduit 52 to the inlet of the needle-like conduit 48. The inlet of the pump tube 24 is coupled by a conduit 54 to the liquid outlet 46, and has its outlet coupled to a sump, not shown.

A container 56 contains a solution of a color reagent for carbon dioxide, such as phenolphthalein. An inlet tube 58 is coupled to the manifold and exists above the reagent solution. An exit tube 60 inletting into the reagent solution is coupled to the pump tube 18, which in turn is coupled by a conduit 62 which is joined with the gas trap outlet 44 at a Y fitting 64. This fitting is coupled to the inlet of a mixing coil 66. The outlet of the coil is coupled by a conduit 68 having a gas vent 70 to the inlet of a flow cell 72. A monochromatic light source 74 projects a beam of light through the flow cell to a light detector 76 to measure the optical density of the fluid. The output of the detector is recorded as a function of time by a recorder 78.

As the acid reacted sample liquid passes through the mixing coil 36, carbon dioxide is released and carried along to the gas trap inlet 40. The carbon dioxide tends to coalesce en route and substantial bubbles of gas will be delivered to the inlet 40. As a bubble of gas passes through the inlet which has a progressively larger cross-sectional area, the volume of the bubble G grows larger, increasing its surface tension. The bubble also approaches the outlet 49 of the needle-like conduit 48, which directs a high volume flow of atomized air at the bubble. The bubble bursts and the carbon dioxide rises up through the trap, carried by the high volume of the air from the conduit, and passes out the trap outlet 44. The reacted liquid passes out through the trap outlet 46 to a sump. The high volume of the air supplied to the trap by the conduit also washes out any carbon-dioxide remaining from a preceding sample segment prior to the arrival of the succeeding sample segment, precluding the contamination thereof. The carbon dioxide in the stream of gas passing out through the trap exit 44 reacts with the color reagent to develop a color whose optical density is directly proportional to the concentration of carbon dioxide. This optical density is measured at the flow cell after the non-reacting air has been vented from the stream through the gas vent 70.

The blood plasma may be pumped at a rate of 0.23 ml./min. through the tube 12. An acid diluent of 0.1 n lactic acid per liter may be pumped at 1.2 ml./min.

through the tube 14, and air at 1.2 ml./min. through the tube 16. The anti-foam agent, which may be a silicon such as 2 ml./liter of water of "Antifoam B" made by Dow Chemical Company of Michigan, may be pumped at 0.1 ml./min. through the tube 20, and air may be pumped at .39 ml./min. through the tube 22 to a No. 20 hypodermic needle. Liquid may be pumped out of the trap through the tube 24 at the rate of 2.4 ml./min. Reagent, such as one gram of phenolphthalein in 100 ml. of methyl alcohol in a carbonate buffer of one part one molar carbonate to two parts one molar bicarbonate mixed as 4.5 ml. buffer, 4.0 ml. phenolphthalein and distilled water to make one liter, may be pumped at the rate of 2.4 ml./min.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What I claim is:

1. A separator for a free gas in a liquid, comprising: a vertically elongated chamber having a lower liquid outlet, an upper gas outlet, and a mediate liquid-gas inlet, wherein said inlet has a progressively larger cross-sectional area as its side wall merges with the side wall of said chamber, and means disposed within said chamber for directing a flow of an additional gas at said inlet at its junction with said chamber.

2. A separator for a free gas in a liquid, comprising: a vertically elongated chamber having a lower liquid outlet, an upper gas outlet, and a mediate liquid-gas inlet, wherein said inlet has a progressively larger cross-sectional area as its side wall merges with the side wall of said chamber, and means disposed within said chamber for directing a flow of atomized gas at said inlet at its junction with said chamber.

3. A separator for a free gas in a liquid, comprising: a vertically elongated chamber having a lower liquid outlet, an upper gas outlet, and a mediate liquid-gas inlet, wherein said inlet has a progressively larger cross-sectional area as its side wall merges with the side wall of said chamber; first pump means coupled to said inlet for supplying gas bearing liquid to said separator; second pump means coupled to said liquid outlet for withdrawing liquid from said separator; and third pump means coupled to an inlet means within said chamber for supplying and directing a flow of an additional gas into said chamber gas inlet at its junction with said chamber.

4. A method of separating free gas in a liquid comprising: transmitting the liquid as a stream in a conduit; coalescing the free gas into bubbles to occlude the conduit; serially enlarging the volume of each occluding bubble as it flows in the conduit; and directing a flow of an additional gas at each enlarged bubble to break each bubble for the escape of the gas therefrom.

References Cited

UNITED STATES PATENTS

| | | | |
|---|---|---|---|
| 1,449,114 | 3/1923 | Hayduck | 55—178 |
| 2,421,568 | 6/1947 | Kurland | 23—232 |
| 2,823,985 | 2/1958 | Strange | 23—254 |
| 3,065,148 | 11/1962 | Ferrari. | |
| 3,116,754 | 1/1963 | Ferrari | 23—253 |
| 3,136,834 | 4/1964 | Lorenz | 55—36 |

REUBEN FRIEDMAN, *Primary Examiner.*

C. N. HART, *Assistant Examiner.*